US010862758B2

(12) United States Patent
Sethi et al.

(10) Patent No.: US 10,862,758 B2
(45) Date of Patent: Dec. 8, 2020

(54) GENERATION OF NETWORK CONFIGURATION AND CONFIGURATION COMMANDS FOR IMPACTED NODES OF A SOFTWARE DEFINED WIDE AREA NETWORK

(71) Applicant: Hewlett Packard Enterprise Development LP, Houston, TX (US)

(72) Inventors: Aseem Sethi, Bangalore (IN); Mark Andrew Denny, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 35 days.

(21) Appl. No.: 16/238,190

(22) Filed: Jan. 2, 2019

(65) Prior Publication Data
US 2020/0213199 A1 Jul. 2, 2020

(51) Int. Cl.
*H04L 12/24* (2006.01)
(52) U.S. Cl.
CPC .......... *H04L 41/12* (2013.01); *H04L 41/0823* (2013.01); *H04L 41/16* (2013.01)
(58) Field of Classification Search
CPC ...... H04L 41/12; H04L 41/16; H04L 41/0823
See application file for complete search history.

(56) References Cited

U.S. PATENT DOCUMENTS

| 6,466,984 | B1 | 10/2002 | Naveh et al. |
| 7,203,744 | B1 | 4/2007 | Parekh et al. |
| 8,693,345 | B2 | 4/2014 | Lee et al. |
| 9,853,882 | B2 | 12/2017 | Vasseur et al. |
| 9,887,874 | B2 | 2/2018 | Vasseur et al. |
| 2016/0028616 | A1* | 1/2016 | Vasseur .................. H04L 45/22 370/412 |
| 2017/0111233 | A1* | 4/2017 | Kokkula ............. H04L 41/0823 |
| 2018/0018197 | A1* | 1/2018 | Liu ......................... G06F 21/53 |
| 2018/0123941 | A1* | 5/2018 | Flamini ................. H04L 45/302 |

(Continued)

OTHER PUBLICATIONS

A Learning-based Adaptive Routing Tree for Wireless Sensor Networks, pp. 1-10, Retrieved from the Internet Sep. 11, 2018 from URL: <pdfs.semanticscholar.org/03a9/b5c0149fc89779f0534f7e1a78d46d1f9381.pdf>.

(Continued)

*Primary Examiner* — Arvin Eskandarnia
*Assistant Examiner* — Chhian (Amy) Ling
(74) *Attorney, Agent, or Firm* — Sheppard Mullin Richter & Hampton LLP

(57) ABSTRACT

A system and method for a self-adapting SDWAN to ensure compliance with client requirements. A SDWAN performance analyzer continuously monitors all of the nodes within an SDWAN, receiving a plurality of operational data regarding operational parameters of each node. Based on the operational data, a machine learning algorithm is applied to develop a tree-structure representative of a desired network configuration, based on the real-time state of the network, to ensure compliance with client requirements. The SDWAN performance analyzer can generate configuration commands to send to one or more of the nodes in the SDWAN to reconfigure the operational parameters of the nodes in line with the desired network configuration.

20 Claims, 6 Drawing Sheets

(56) References Cited

U.S. PATENT DOCUMENTS

2019/0289647 A1* 9/2019 Li .................. H04W 76/11
2020/0036589 A1* 1/2020 A .................. H04L 41/0813

OTHER PUBLICATIONS

Department of Computer Science and Engineering Indian Institute of Technology Hyderabad, India, Jun. 26, 2016, pp. 1-7, Retrieved from the Internet Sep. 11, 2018 from URL: <arxiv.org/pdf/1606.05743.pdf>.

* cited by examiner

GENERATION OF NETWORK CONFIGURATION AND CONFIGURATION COMMANDS FOR IMPACTED NODES OF A SOFTWARE DEFINED WIDE AREA NETWORK

DESCRIPTION OF RELATED ART

Software defined wide area networks (SDWANs) are network topologies that interconnect sites of a wide area network (WAN) using the principles inherent in software defined networking (SDN), such as the separation of the control layer of traffic management from the data forwarding layer. SDWANs support infrastructure consolidation through network function virtualization (NFV). NFV reduces the administrative overhead and hardware cost of adding network functions to a WAN by virtualizing the network functions using virtual machines on more common and cheaper "commodity" hardware.

SDWANs may be implemented by creating a virtual overlay that is transport-agnostic and abstracts underlying private or public network connections. These network connections may include MPLS, internet broadband, fiber, wireless or Long Term Evolution (LTE), to name a few. In some examples, virtual private network (VPN) tunnels are created between WAN sites to allow for private, secure interconnection across potentially vulnerable and insecure public links (e.g. Internet links). Clients may maintain existing WAN links and implement an overlay SDWAN using these tunnels to optimize bandwidth by directing WAN traffic to and from other WAN sites using identified routes that include these tunnels. Accordingly, SDWANs may be used to centralize network control across the entire WAN. Remote users, such as branch users, are capable of utilizing resources hosted at a data center and/or the cloud to run applications within the network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
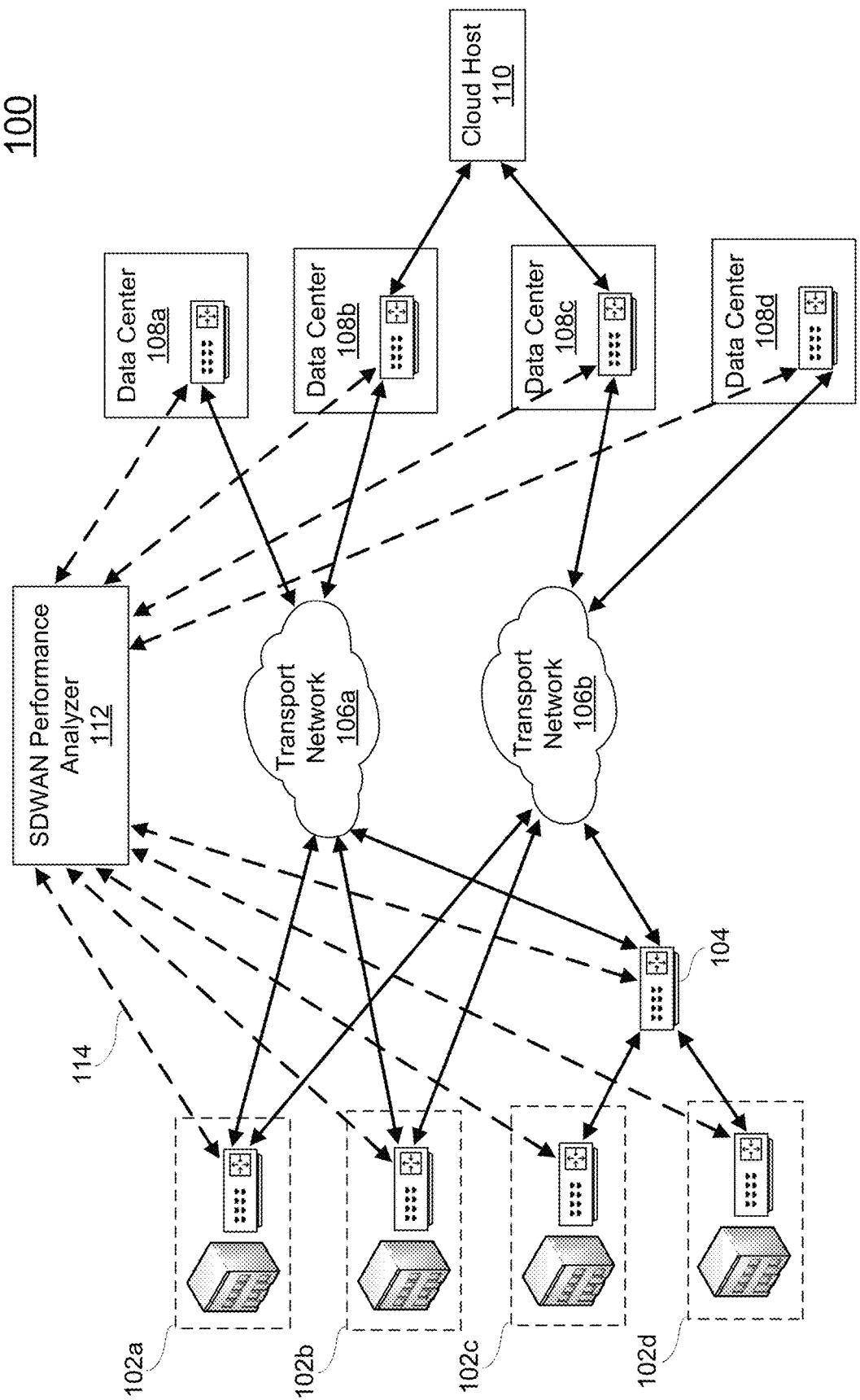
FIG. 1 illustrates an example SDWAN environment in accordance with embodiments of the technology disclosed herein.

The figures are not exhaustive and do not limit the present disclosure to the precise form disclosed.

DETAILED DESCRIPTION

A software defined wide area network (SDWAN) allows a network administrator to connect branch locations to a core site over a wide area network (WAN). Using software defined networking (SDN). SDN decouples network traffic decisions from the various devices within the network, such as routers, switches, bridges, and other common network devices. This decoupling essentially turns each networking device into a simple packet forwarding device. The SDWAN sets the potential traffic paths through each network device based on client policies (e.g., QoS requirements; bandwidth; etc.) to connect the branch locations within the SDWAN to the core site or data center, which is provided to each network device over a control channel. Instead of making a decision on how to route traffic when data is received, the network devices simply execute the route identified by the SDWAN administrator.

The use of a SDWAN facilitates virtualization of network services across the WAN. Network function virtualization (NFV) reduces the administrative overhead and hardware cost of adding network functions to a WAN by virtualizing the network functions using virtual machines on more common and cheaper "commodity" hardware, rather than proprietary, dedicated hardware (as traditionally required). For example, functions like routing, load balancing, and firewalls may be operated as virtual machines (VMs) hosted at a data center and/or in the cloud. However, NFV focuses on virtualizing functions, but does not itself concern how data packets are routed to the virtual machines running the network functions. SDWAN combined with NFV provides a more fully realized virtual network, the SDWAN providing the routing policies for traffic flows from branch locations to the core site or data center hosting the NFV virtual machines. Branch users are capable of utilizing these resources through the SDWAN, reducing reliance on expensive proprietary hardware and reducing the amount of computing hardware required at branch sites of the WAN.

Today, traffic traversing the SDWAN is generally associated with various quality of service (QoS) and/or service level agreement (SLA) requirements. SDWAN design has focused on traffic engineering approaches to ensure these requirements are met for client traffic, through classifying traffic and designing routing rules for each class. A network administrator takes the client's QoS and SLAs and designs routing tables and access lists identifying how classes of traffic are to be treated within the SDWAN. To ensure compliance with the requirements, current approaches focus on traffic engineering approaches, such as updating the QoS levels applied to certain traffic, identifying different transport networks to connect traffic associated with a shared virtual application with better characteristics, and similar traffic-centric approaches.

By employing this narrow focus, SDWANs are limited in their ability to adapt to changing conditions within the network. Traffic-centric approaches fail to account for possible changes in the operating state of all the nodes in the SDWAN which may also impact compliance with client requirements. It may be possible to adjust the operating characteristics of nodes within the network such that client requirements may be met without having to adjust routing tables or access lists. By limiting the focus purely on the traffic flows, current approaches fail to understand the holistic "health" of the network and how best to adapt to ensure compliance.

Embodiments of the technology of the present disclosure may provide systems and methods for an SDWAN capable of adapting various operational characteristics of nodes to achieve compliance with client requirements. An SDWAN performance analyzer may be included to monitor all of the nodes within the SDWAN network, obtaining operational characteristics across the entire network. Using this information, the SDWAN performance analyzer may generate a network tree, illustrating the relationships between all the nodes in the network and how each node is operating (e.g., number of sessions, types of traffic, available bandwidth, etc.). Moreover, the SDWAN performance analyzer may apply machine learning to the received data to determine one or more configurable parameters within the network that can be adjusted in real-time to optimize the network performance to meet client requirements. These configurable parameters may encompass traffic-related parameters such as updated routing tables, QoS levels applied, or addition/deletion of traffic types. The configurable parameters may also include node-related parameters, such as allocated virtual memory and/or CPU cycles to particular applications, bandwidth assigned to particular types of traffic, and other operational parameters of each node. In various embodiments, a combination of these types of configurable parameters may be adjusted. The SDWAN performance analyzer may generate the necessary policy files and configuration commands to send to each node to achieve this optimal performance. In this way, embodiments of the technology disclosed may accomplish more than merely updating a network with new traffic-related policies, instead providing an SDWAN capable of "healing" itself at run-time through changing the operational characteristics of the nodes themselves.

Embodiments of the present technology provide a more adaptable SDWAN environment than presently used. In prior SDWANs, many of the parameters impacting the reliability and compliance of a network with client requirements and policies were statically developed, with the focus being on changing traffic patterns in the event that connectivity issues arose. This static development reduced the ability of the SDWAN to adapt to changing client requirements/policies or adapt to issues within the network. Through the technology disclosed herein, SDWANs are more flexible. Examples consistent with this disclosure improve SDWAN responsiveness to changing traffic conditions within the WAN by adapting routing decisions and node parameters automatically when conditions change. This adaptation occurs more quickly and with less administrator intervention than in current WAN technologies, resulting in fewer packets being routed through undesired nodes and impacting compliance with client requirements. Also, a self-healing SDWAN is possible by leveraging the power of machine learning in embodiments of the technology, where the SDWAN itself can identify potential changes that need to be made within the network beyond any base set of instructions set by a SDWAN administrator.

FIG. 1 illustrates an example SDWAN 100 in which embodiments of the technology disclosed herein are applicable. The example SDWAN 100 is simplified for ease of discussion, and a person of ordinary skill in the art would understand that the technology of the present disclosure is applicable to SDWANs with architectures of greater or lesser complexity. As illustrated in FIG. 1, the example SDWAN 100 includes a plurality of remote locations 102a, 102b, 102c, 102d, each with an SDWAN node device. An SDWAN node device is a networking device, such as a router, switch, modem, bridge, hub, or other common network device, which serves as a gateway to, or intermediate point within, the SDWAN. Remote locations 102a, 102b, 102c, 102d could be a branch office or other user located a distance from a network core site, such as a data center. In various embodiments, the core site is the entity which hosts virtualized network functions (VNFs) that may be shared by all of the remote locations 102a, 102b, 102c, 102d. In various embodiments, the SDWAN node device at the remote locations 102a, 102b, 102c, 102d is configured to act as an edge device for the remote location, providing an entry point to the SDWAN 100. The SDWAN node device at remote locations 102a, 102b, 102c, 102d may comprise a modem or other gateway networking device in various embodiments.

In various embodiments, the traffic between remote locations and the data centers may be routed through an intermediate SDWAN node device 104. Intermediate SDWAN node device 104 may be similar to the SDWAN node devices at remote locations 102a, 102b, 102c, 102d and data centers 108a, 108b, 108c, 108d. Intermediate SDWAN node device 104 may serve as the access point to the transport networks 106a, 106b of SDWAN 100 for a plurality of remote locations. As illustrated in FIG. 1, remote locations 102c and 102d may be connected to intermediate SDWAN node device 104. Using one or more intermediate devices, like intermediate SDWAN node device 104, within the SDWAN enables the creation of different service regions, in some embodiments.

SDWAN 100 further includes one or more data centers 108a, 108b, 108c, 108d. Each data center 108a, 108b, 108c, 108d also has an SDWAN node device, similar to the SDWAN node device at remote locations 102a, 102b, 102c, 102d. In various embodiments, data centers 108a, 108b, 108c, 108d may host one or more applications which may be used by users at the remote locations 102a, 102b, 102c, 102d. In various embodiments, one or more data centers may be managed by the client that owns the SDWAN 100. In other embodiments, one or more data centers may be managed by a third party service provider.

Each transport network 106a, 106b may be associated with a set of data centers. As illustrated in FIG. 1, transport network 106a is associated with data centers 108a, 108b, while transport network 106b is associated with data centers 108c, 108d. In various embodiments, some applications may be hosted in cloud host 110, which may be accessed by one or more data centers associated with either transport network 106a or 106b. As illustrated in FIG. 1, data centers 108b and 108c provide access to at least one cloud application hosted in the cloud host 110.

Each remote location 102a, 102b, 102c, 102d is connected through the SDWAN node device to transport networks 106a, 106b. Transport networks 106a, 106b include different transport technologies, such as public Internet, multiprotocol label switching (MPLS), private Internet, asynchronous transfer mode, wireless WAN, broadband, satellite communications, or other network technologies. In various implementations, transport networks may be networks of various different service providers. As illustrated, the SDWAN 100 may include more than one transport network (transport networks 106a, 106b). SDWAN 100 may provide a method of defining a client network, overlaid on existing transport infrastructures of service providers for the physical routing of SDWAN traffic between different SDWAN node devices. Although only two transport networks 106a, 106b are shown in FIG. 1, various embodiments may include other quantities of transport networks, providing additional flexibility in how application traffic is routed from remote locations 102a, 102b, 102c, 102d to the associated data center 108a, 108b, 108c, 108d hosting the application. Data centers 108a, 108b, 108c, 108d include their own SDWAN node devices, providing access to the SDWAN 100 by servers and other components of the respective data center.

Within SDWAN 100, connectivity between remote locations with the data centers and/or cloud applications may be controlled via control software hosted by the SDWAN administrator. The client may develop policies focused on ensuring different traffic classes are routed within the network such that quality of service (QoS) and service level agreement (SLA) requirements are met. These policies are used to develop routing tables, which are distributed to the SDWAN node devices (like the SDWAN node devices described with respect to FIG. 1). The SDWAN node devices may identify the traffic from the different sessions streaming through the SDWAN node device and apply the routing rules embodied in the routing table for that category of traffic. To ensure that the requirements are met, clients may focus on traffic engineering principles, modifying the route certain traffic take through the transport networks to meet requirements. For example, a network administrator may set rules for a particular traffic class such that it is generally transmitted through the SDWAN node device of a branch office to an intermediate SDWAN node device (to apply DPI), and then over the public Internet transport network to a data center, but if X scenario occurs, the same traffic may be transmitted over an MPLS network. Accordingly, the SDWAN node devices and the data paths between branch offices and the data centers/cloud architecture may be determined before installation. Therefore, network administrators are limited to applying traffic engineering approaches (i.e., selecting a pre-determined alternate traffic path) to ensuring networks are meeting QoS and SLA requirements. If network conditions impact all pre-determined paths such that simply changing the traffic path does not ensure QoS or SLA requirements, current solutions are incapable of taking other actions which could alleviate the problems, such as run-time configuration of the nodes.

Embodiments of the technology disclosed herein may be implemented to enable an adaptable SDWAN in which the holistic "health" of the network is utilized to provide adjustments to the operation of the network. As illustrated in the example of FIG. 1, an SDWAN performance analyzer 112 is communicatively coupled to the various "nodes" within SDWAN 100. An SDWAN "node" is any location with an SDWAN node device. For example, the remote locations 102a, 102b, 102c, 102d, intermediate SDWAN node device 104, and data centers 108a, 108b, 108c, 108d would each be represented as a "node" within SDWAN 100. SDWAN performance analyzer 112 is configured to collect operational data 114 from each of the nodes within the network. In various embodiments, the nodes may be modified to enable communication with the SDWAN performance analyzer 112. For example, in some embodiments legacy SDWAN node devices may be upgraded to include the capabilities discussed in this disclosure. Operational data 114 may provide characteristics representative of how each node is operating within SDWAN 100. In various embodiments, operational data 114 may include: bandwidth available at each node; number of sessions flowing through each node; average packet drops at each node; average latency at each node; traffic classes flowing through each node; current traffic policies applied to traffic classes flowing through each node; current routing table at each node; average CPU time taken by processes running at each node; changes in main or cache memory at each node; average CPU usage over a certain period at each node; VHFs loaded at each load; system resource allocation at each node; amongst other operational parameters of a node.

In some embodiments, operational data 114 can be sent to SDWAN performance analyzer 112 over a control channel in the SDWAN 100. The control channel is a communication path between the SDWAN performance analyzer 112 and the SDWAN nodes that is separate from the data path. In some embodiments, the control channel of the SDWAN performance analyzer 112 may be the same channel used by the SDWAN administrator to control the SDWAN 100. In various embodiments, the control channel may be a broadcast channel in SDWAN 100 over which the SDWAN performance analyzer 112 may obtain operational data 114 from the different SDWAN nodes. In other embodiments, the control channel may be a dedicated channel to each SDWAN node, over which the SDWAN performance analyzer 112 may obtain operational data 114 from each specific SDWAN node over a dedicated channel. In various embodiments, the operational data 114 sent over the control channel may be sent using SMNP or any other transmission protocol known in the art. SDWAN performance analyzer 112 can receive operational data 114 over a control plane, which may be separate from the data plane upon which traffic data is transmitted. In certain examples, the control plane may be a logical or virtualized separation of data that is transceived across the same network links as the data plane. In certain other examples, the control plane may be separate network links from data plane network links that are solely used for network control information. In this way, control information transmitted to the SDWAN performance analyzer 112 may be isolated from the application data, reducing the total bandwidth required for transmission to SDWAN performance analyzer 112. In various embodiments, operational data 114 may include metadata representing the various operational parameters of each node.

Figure 2:
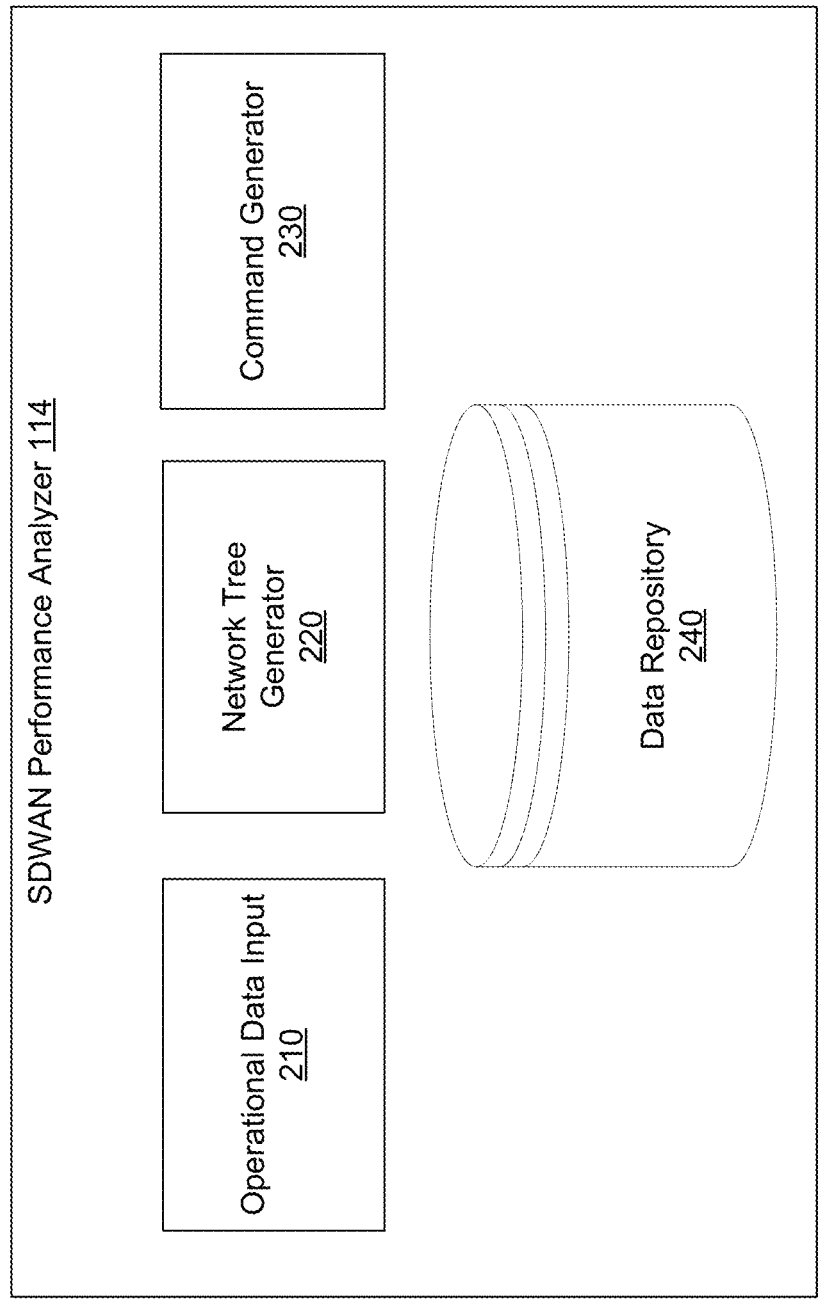
FIG. 2 illustrates an example SDWAN performance analyzer in accordance with embodiments of the technology disclosed herein.

FIG. 2 illustrates an example SDWAN performance analyzer 112 of FIG. 1. As illustrated, the example SDWAN performance analyzer 112 includes an operational data input component 210. Operational data input component 210 may be configured to obtain the operational data 114 discussed above with respect to FIG. 1. In various embodiments, operational data input component 210 is configured to interpret received metadata to identify categories of information. In some embodiments, operational data input component 210 is configured to continuously receive operational data from all the nodes within the SDWAN. Nodes may be configured to transmit operational data whenever a change occurs, at set intervals, or when at least one operational parameter of the node exceeds a maximum performance threshold. In some embodiments, operational data input component 310 can poll the nodes in the network for the operational data.

To reduce the impact of reporting operational data to SDWAN performance analyzer 112, an operational data buffer may be distributed within each of the nodes and configured to send operational data in bulk after being filled in various embodiments. Compression may also be used in some embodiments, with operational data input component 210 configured to decompress the received data. By obtaining the operational data in real-time (whether through polling by the operational data input component 210 or automatic transmission from the nodes), embodiments of the SDWAN performance analyzer 112 are capable of monitoring the health of the network in real-time. Operational data input component 210 can be configured to store the received data in data repository 240 for use by other components of the SDWAN performance analyzer 210, for example, as training data for machine learning algorithms used to identify modifications to the nodes.

The example SDWAN performance analyzer 112 includes a network tree generator 220 configured to generate a tree-structure representing the health of the SDWAN. The network tree generator 220 may run machine learning algorithms on the operational data obtained by the operational data input component 210 to understand how the entire network of nodes are operating and determine how to ensure compliance with client requirements. In various embodiments, network tree generator 220 may run one or more types of machine learning algorithms, including but not limited to: linear regression algorithms; logistic regression algorithms; linear discriminant analysis; decision trees; naïve Bayes; learning vector quantization; support vector machines; boosting approaches; or any other machine learning approach. In various embodiments, network tree generator 220 may determine the impact of real-time changes in the operational parameters of the nodes on compliance with client requirements through application of one or more of these machine learning algorithms. Network tree generator 220 may utilize the machine learning algorithms to develop models of the network using real-time data and, based on the results, identify how specific changes in the network (e.g., allocating additional VCPU to a particular application) would impact network performance. Based on the results of the one or more machine learning algorithms employed, network tree generator 220 can generate a representation of a desired network configuration for the SDWAN. In various embodiments, the desired network configuration may be a model that meets the various client requirements and policies with the least amount of change to the network configuration. In other embodiments, the desired network configuration may be a model which has the greatest amount of tolerance for predicted changes that may occur.

In various embodiments, the training data used in training the one or more machine learning algorithms run by the network tree generator 220 may include historical operational parameters of nodes stored in data repository 240, as well as new, real-time data obtained from the operational data input component 210. The machine learning algorithms may consider a variety of variables impacting compliance with client requirements. Non-limiting examples of the variables network tree generator 220 may use include: average latency between nodes; classification of traffic flows through the nodes; average hops between nodes; average packet drops for each node; applicability of deep packet inspection; buffer depths; memory allocation; CPU allocation; total bandwidth of each node; available bandwidth of each node; among others. The network tree generator 220 also accounts for client requirements, which may include but are not limited to certain QoS and SLA requirements for particular traffic (e.g., higher QoS for traffic from engineering than traffic from sales offices).

Figure 3:
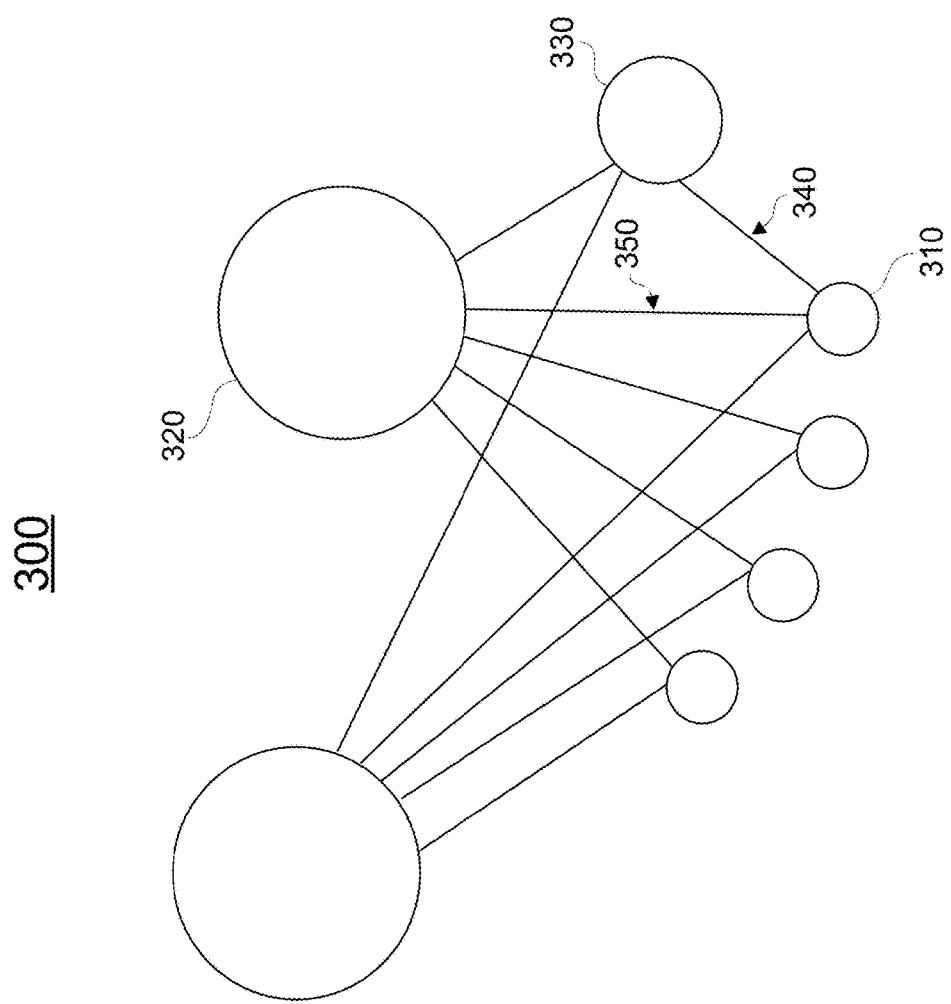
FIG. 3 illustrates an example tree-structure generated by a network tree generator in accordance with embodiments of the technology disclose herein.

Through machine learning, network tree generator 220 generates a tree-structure representation of the network. FIG. 3 is a representation of the tree-structure 300 generated by the network tree generator 220 in accordance with embodiments of the present disclosure. The tree-structure 300 comprises a variety of nodes and edges. Each node represents an entity within the network, identified based on the presence of an SDWAN node device. In some embodiments, a node may represent a virtual network function (VNF) executed by an intermediate SDWAN node device, like intermediate SDWAN node device 104 discussed with respect to FIG. 1. For example, 310 may represent a branch office (remote location) in California, 320 may represent a data center hosting applications in Colorado, and 330 may represent an intermediate SDWAN node device executing a security application. Each edge illustrates not only a connection between nodes, but also the policies and operational parameters determined to optimize compliance with the client requirements. For example, edge 340 indicates that traffic type A from the California branch office (node 310) should be sent to the intermediate SDWAN node device (node 330) for further security. Edge 340 would also indicate the bandwidth allocated for transmitting traffic A to node 330, among other specific parameters of nodes 310 and 330 related to traffic A. Edge 350 indicates that traffic B and traffic C should be sent to the data center (node 320), without adding the additional security at node 330, and provides similar detail regarding traffic B and C. as provided on edge 340 for traffic A.

The example tree-structure 300 generated by the network tree generator 220 represents a desired configuration of the network to ensure compliance with client requirements. The desired network configuration represents the operational parameters settings for all the nodes in the SDWAN. For example, as discussed above, the network tree generator 220 may generate a new branch (node 310 to node 330 to node 320) by modifying the routing rules for a previous traffic classification, or generating a new traffic classification. In some embodiments, the network tree generator 220 generates an optimized configuration of the network as the desired network configuration Although the example tree-structure 300 only shows a few nodes and edges, a person of ordinary skill would understand that this structure is applicable to more complex SDWAN networks, and the simplified illustration should not be interpreted to limit the applicability of this disclosure to only simple networks.

Referring again to FIG. 2, SDWAN performance analyzer 112 includes a command generator 230. Command generator 230 is configured to identify required changes within the network that needs to be made based on the optimized parameters identified by the network tree generator 220. In various embodiments, command generator 230 can compare the parameters output from the network tree generator 220 with the current parameters within the network, as obtained from operational data input component 210. In some embodiments, this data may be sent from the operational data input component 210 to the command generator 230, while command generator 230 may obtain the current parameters within the network from the data repository 240.

Data repository 240 can tag operational parameters for each node within the network as "current." In various embodiments, command generator 230 identifies which nodes within the network requires a modification to one or more operational parameters. Command generator 230 can then generate the necessary commands to send to the respective nodes to make the required configuration changes and send those out to the nodes of the control channel. For example, the command generator 230 may determine that the routing table or access list for traffic running through a node (e.g., node 310 of FIG. 3) needs to be updated, and generate an update to transmit to the node. As another example, command generator 230 may identify that the virtual CPU cycles allocated for a particular application at a node needs to change, to allocate more cycles to the application due to the large volume of associated traffic. The command generator can generate a command to the necessary node or nodes to reconfigure the CPU allocations accordingly. Command generator 230 in various embodiments may generate one or more commands for changing the virtual machine configurations at nodes in the SDWAN, such as commands for virtual CPU allocation, virtual RAM memory allocation, virtual network interfaces, edit port configuration with VLAN tags; as well as enabling or disabling logging and load balancing functions with respect to the virtual machines.

By implementing embodiments of the SDWAN performance analyzer, an SDWAN is capable of self-adapting to changes in the network to ensure compliance with client requirements. For example, a content streaming client may have a policy whereby video streaming traffic within the network is to be given priority over other traffic. SDWAN performance analyzer may identify that the bandwidth available at one or more remote locations may be limited and or reaching its maximum, due to issues within the network. An optimized network tree generated by the network tree generator of SDWAN performance analyzer may indicate that the bandwidth allocation for different traffic at several nodes within the network should be adjusted, providing more bandwidth at the impacted nodes to video streaming traffic while reducing the amount of bandwidth allocated to other traffic. The SDWAN performance analyzer may also determine that the CPU cycles allocated to a video streaming application at an associated data center node should be increased to process video streaming requests faster. The command generator of SDWAN performance analyzer can then generate the required commands to send to each of the SDWAN devices to make the requisite changes to the nodes. In this way, the self-adapting SDWAN can achieve compliance without reliance solely on traffic engineering approaches failing to account for performance at other areas of the network.

In some embodiments, the command generation functionality of SDWAN performance analyzer may be distributed throughout the various nodes. For example, in some embodiments each node may include a version of the command generator component discussed with respect to FIG. 2. In such embodiments, the SDWAN performance analyzer would send the tree-structure generated by the network tree generator to each node. Each node would identify differences between the node's current configuration and the tree-structure received, and generate the required commands locally. In some embodiments, the SDWAN performance analyzer may be capable of sending only the information from the tree-structure relevant to the specific node.

In various embodiments, the SDWAN performance analyzer may run on one of the SDWAN node devices. For example, in some embodiments the SDWAN performance analyzer may be operated as a virtual application on a SDWAN node device, such as a bridge gateway. In such embodiments, the specific SDWAN node device would both serve its intended network routing functionality, in addition to operating as the SDWAN performance analyzer as discussed above. The SDWAN performance analyzer may also be its own computing device within the SDWAN in other embodiments. Still further, the SDWAN performance analyzer may be itself a VNF within the SDWAN, running on servers at a core site.

Figure 4:
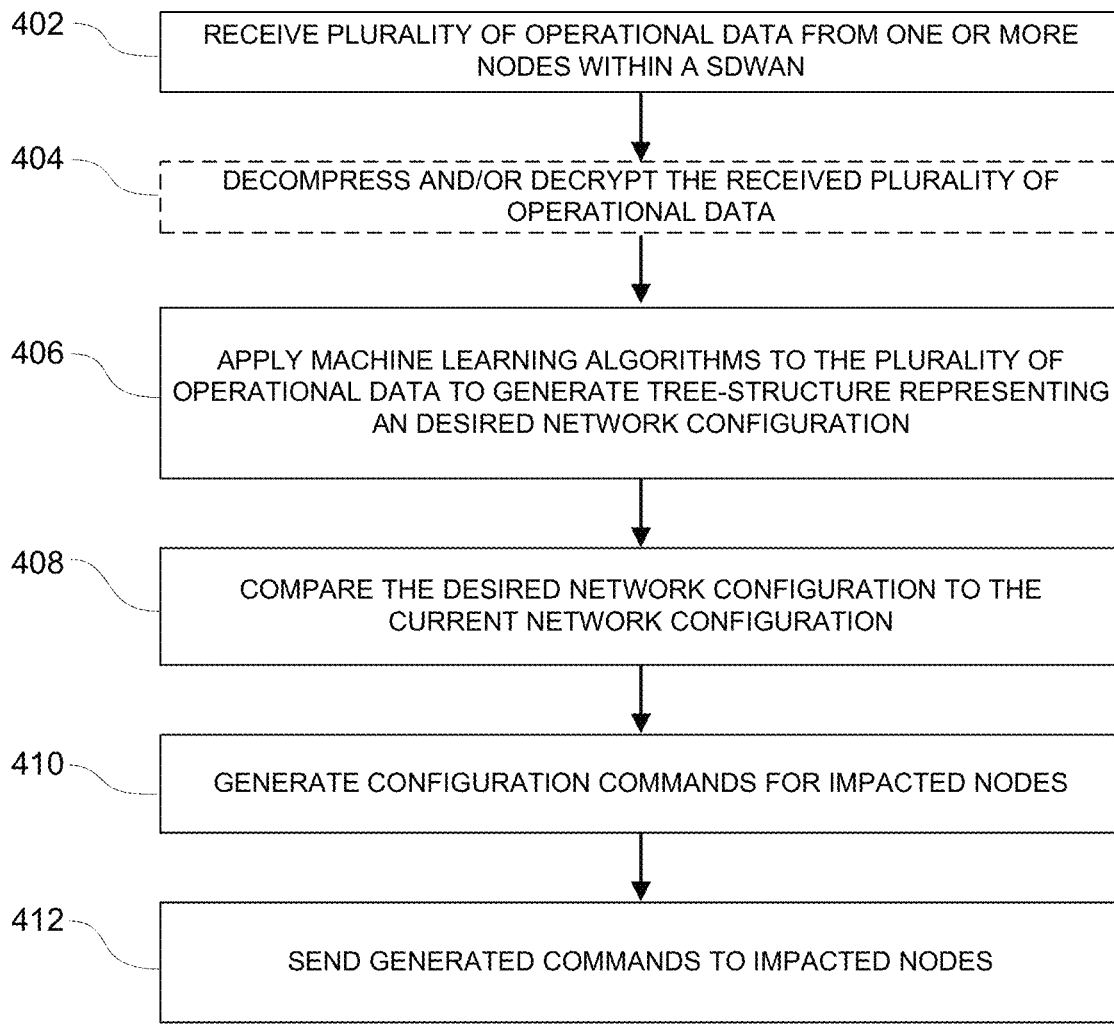
FIG. 4 illustrates an example method in accordance with various embodiments of the technology disclosed herein.

FIG. 4 is an example method 400 in accordance with embodiments of the technology disclosed herein. The example method 400 may be performed by a computing device within an SDWAN configured to act like the SDWAN performance analyzer discussed with respect to FIG. 2. At operation 402, a plurality of operational data from nodes within the SDWAN is received. In various embodiments, the plurality of operational data is received over a control channel. The plurality of operational data may be similar to the types of operational data discussed above with respect to FIG. 1. The nodes within the SDWAN may be any SDWAN node device located at a remote location, data center, client headquarters, or other location within the wide area network and connected through the SDWAN. In various embodiments, the plurality of operational data may be received by an operational data input component, such as operational data input component 210 discussed with respect to FIG. 2. Although referred to as "received," the operational data may be obtained in a number of ways, as discussed above with respect to FIG. 2, including through polling of the nodes in the SDWAN. In some embodiments, the operational data received may be compressed and/or encrypted, and operation 404 may be performed to decompress and/or decrypt the received operational data.

At operation 406, machine learning algorithms are applied to the operational data to generate a tree-structure representing a desired network configuration. Operation 406 may be performed by a component similar to the network tree generator 220 discussed above with respect to FIGS. 2 and 3. The training data sets used in the machine learning algorithms may be operational data stored in a data repository. In some embodiments, historical operational parameters of the various nodes may be used in the machine learning algorithms. The machine learning algorithms determine a desired configuration of the nodes within the SDWAN such that client requirements may be met in view of the current state, or "health," of the SDWAN on the whole. In some embodiments, the machine learning algorithms may determine the need for new branches within the tree-structure, representing new traffic flow paths between nodes. In some embodiments, the machine learning algorithms may determine the need to make changes to the allocations of resources within a node or a plurality of nodes to address issues within the network, which would be represented along the respective edges. The data associated with the tree-structure generated may also be stored in a data repository for future use.

At operation 408, the desired network configuration (represented by the tree-structure) is compared to the current network configuration. A network configuration in this instance refers to the operational parameters of all the nodes within the network. A component, like the command generator 230 discussed with respect to FIG. 2, may access the current network configuration from a data repository or receive real-time information on the current network configuration from the component associated with operation 402. Based on the comparison, one or more operational parameters of one or more nodes in the SDWAN are identified as requiring modification to fall in line with the desired network configuration.

At operation 410, configuration commands for the identified impacted nodes are generated. Configuration commands are commands informing nodes how to reconfigure one or more operational parameters, similar to the commands discussed above with respect to FIGS. 2 and 3. At operation 412, the commands are transmitted to the impacted nodes over the control channel.

Figure 5:
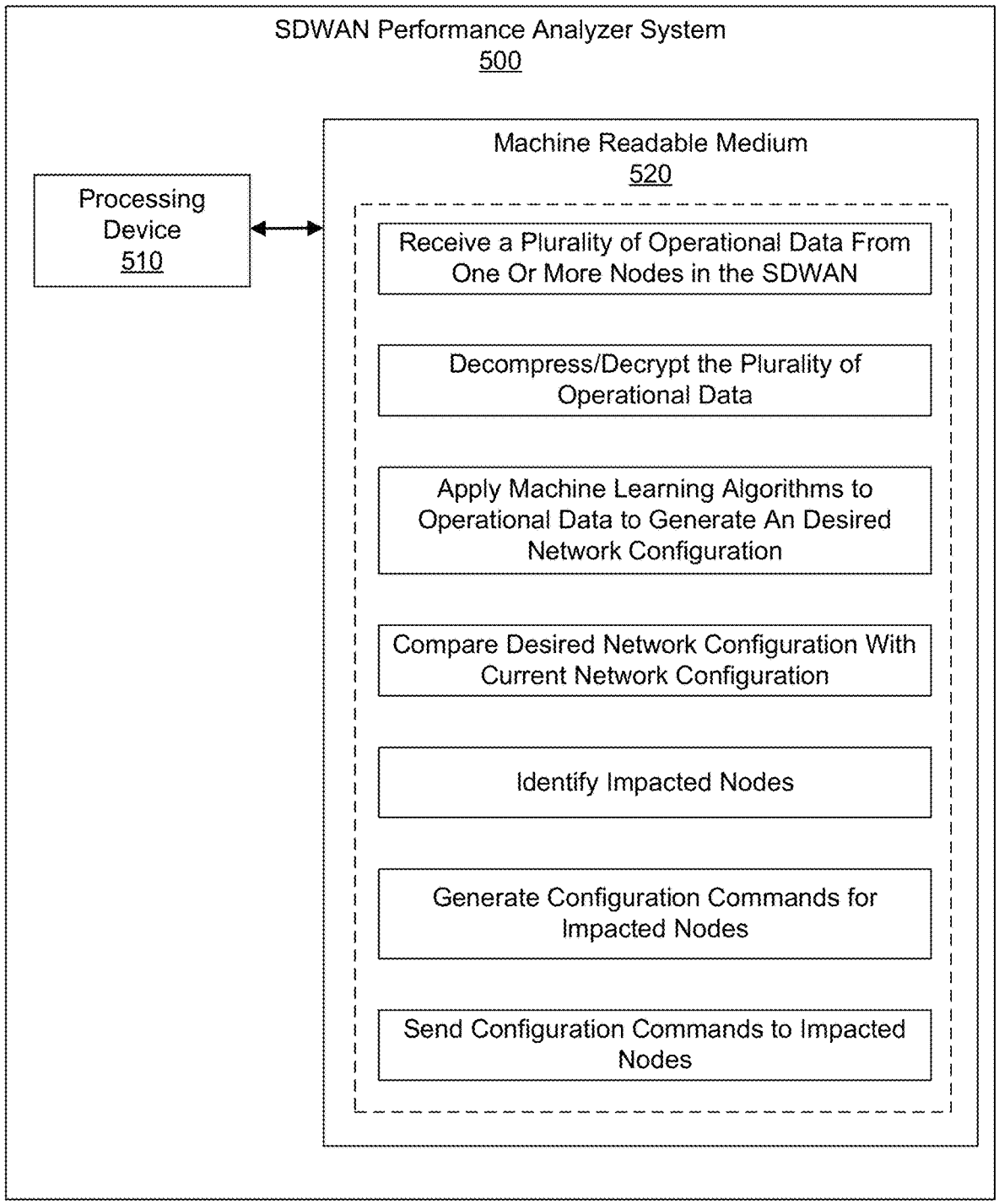
FIG. 5 illustrates an example intelligent ML model management system in accordance with various embodiments of the technology disclosed herein.

FIG. 5 illustrates an example SDWAN performance analyzer system 500 in accordance with various embodiments of the technology disclosed herein. In various embodiments, the SDWAN performance analyzer system 500 may be an SDWAN device, similar to the SDWAN node devices discussed with respect to FIG. 1. In other embodiments, SDWAN performance analyzer system 500 may be a dedicated set of servers configured to monitor the SDWAN environment and enable self-adaption based on network conditions. SDWAN performance analyzer system 500 includes a processing device 510. In various embodiments, processing device 510 may be one or more processors within a server. In other embodiments, processing device 510 may be one or more processors within one or more servers.

Processing device 510 is configured to execute instructions stored on a machine readable medium 520. Machine readable medium 520 may be one or more types of non-transitory computer storage mediums. Non-limiting examples include: flash memory; solid state storage (SSD) devices; storage area network (SAN); removable memory (e.g., memory stick, CD, SD cards, etc.); or internal computer RAM or ROM; among other types of computer storage mediums. The instructions stored on the machine readable medium 520 may include various sub-instructions for performing the function embodied by the identified functions. For example, the instruction "Receive a Plurality of Operational Data From Nodes in the SDWAN" may comprise sub-instructions to perform actions discussed with respect to the operational data input component 210 of FIG. 2, and operation 402 of FIG. 4. The instruction "Decompress/Decrypt the Plurality of Operational Data" may include sub-instructions known in the art to decompress and/or decrypt data discussed with respect to the operational data input component 210 of FIG. 2, and operation 404 of FIG. 4. The instruction "Apply Machine Learning Algorithms to Operational Data to Generate An Desired Network Configuration" may include sub-instructions to perform the actions discussed with respect to the network tree generator 220 of FIG. 2, and operation 406 of FIG. 4, respectively. The instruction "Compare Desired Network Configuration With Current Network Configuration," "Identify Impacted Nodes," "Generate Configuration Commands for Impacted Nodes," and "Send Configuration Commands to Impacted Nodes" may include sub-instructions for performing actions associated with the command generator 230 discussed with respect to FIG. 2, and operations 408-412 of FIG. 4. Machine readable medium 520 may include additional instructions to perform other functions in various embodiments.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Although discussed with respect to SDWANs, a person of ordinary skill in the art would understand the technology disclosed herein is applicable to any network comprising a variety of access points. For example, a similar performance analyzer, like the SDWAN performance analyzer, may be implemented within a local area network (LAN) having various devices serving to provide access to the network for a variety of users. Such a performance analyzer may obtain operational data from various routers, switches, or other devices within the LAN indicative of their performance, and identify and optimal configuration by applying similar machine learning techniques. Nothing in this specification should be interpreted as limiting the technology to solely the SDWAN environment.

Figure 6:
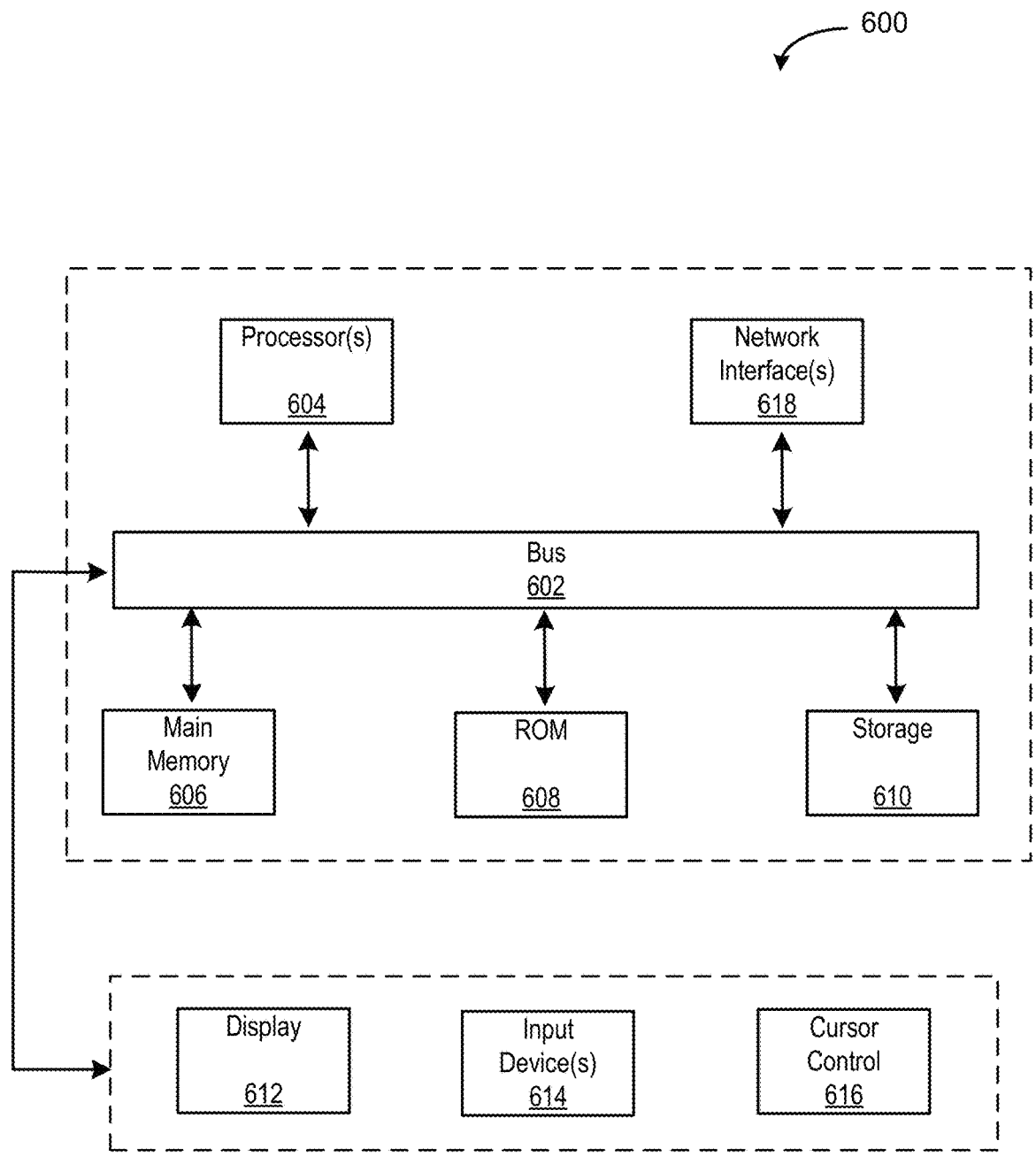
FIG. 6 is an example computing component that may be used to implement various features of embodiments described in the present disclosure.

FIG. 6 depicts a block diagram of an example computer system 600 in which various of the embodiments described herein may be implemented. In various embodiments, each SDWAN node device may comprise a computer system like computer system 600. Moreover, the SDWAN performance analyzer 112 discussed above with respect to FIGS. 1-5 may be implemented on a system like computer system 600. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 706 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
 receiving a plurality of operational data from one or more nodes within a software-defined wide area network (SDWAN);
 applying a machine learning algorithm to the plurality of operational data to generate a tree-structure representing a desired network configuration, the desired network configuration having a fewest number of changes to a configuration of one or more nodes within the SDWAN to comply with one or more client requirements and policies;
 comparing the tree-structure representing the desired network configuration to a current network configuration;
 identifying one or more impacted nodes, wherein an impacted node is a node within the for which one or more changes to operational parameters of the node are determined based on the comparison, the operational parameters comprising node-specific parameters;
 generating one or more configuration commands for each of the one or more impacted nodes, wherein at least one configuration command changes a node-specific parameter of at least one impacted node comprising one or more of: an amount of allocated virtual memory to a virtual application executed at a node device; an amount of allocated central processing unit (CPU) cycles to a virtual application executed at a node device; and
 sending the one or more configuration commands to each respective one of the one or more impacted nodes to configure the one or more impacted nodes in accordance with the desired network configuration determined by the machine learning algorithm.

2. The method of claim 1, wherein receiving the plurality of operational data comprises polling the one or more nodes within the SDWAN for updated operational data.

3. The method of claim 1, wherein receiving the plurality of operational data comprises receiving a continuous stream of operational data from the one or more nodes of the SDWAN.

4. The method of claim 1, wherein the tree-structure representing a desired network configuration comprises a representation of all of the nodes within the SDWAN and a plurality of edges within the SDWAN.

5. The method of claim 1, wherein the machine learning algorithm comprises one or more of: a linear regression algorithm; a logistic regression algorithm; a linear discriminant analysis algorithm; a decision tree; a nave Bayes algorithm; a learning vector quantization algorithm; a support vector machines algorithm.

6. The method of claim 1, wherein the one or more configuration commands further comprise configuration commands to control a configuration of a node concerning one or more of the following operational parameters: an amount of bandwidth allocated to one or more traffic classes; a routing table or access control list identifying routing rules for one or more traffic classes; a rule to route one or more traffic classes to an intermediate device to perform one or more virtual network functions.

7. The method of claim 1, further comprising storing the plurality of received operational data, the generated tree-structure representing a desired network configuration, or a combination of both in a data repository.

8. The method of claim 1, wherein sending the one or more configuration commands occurs over a control channel.

9. A system, comprising:
 a node device communicatively coupled within a software-defined wide area network (SDWAN);
 a SDWAN performance analyzer communicatively coupled to the node device and comprising a network tree generator configured to apply a machine learning algorithm to the plurality of operational data to generate a tree-structure representing a desired network configuration of the SDWAN, the desired network configuration having a fewest number of changes to a configuration of the node device within the SDWAN to comply with one or more client requirements and policies;
 wherein the SDWAN performance analyzer is configured to monitor the node device to obtain operational data indicative of a health of the SDWAN and determine one or more operational parameters of one or more node devices to modify to adapt the SDWAN to one or more changes in the SDWAN, the operational parameters comprising node-specific parameters, wherein the node-specific parameters comprise one or more of: an amount of allocated virtual memory to a virtual application executed at a node device; an amount of allocated central processing unit (CPU) cycles to a virtual application executed at a node device.

10. The system of claim 9, the node device comprising at least one of the following: a remote location; an intermediate SDWAN node device; a data center.

11. The system of claim 9, the SDWAN performance analyzer comprising:
 an operational data input component configured to receive a plurality of operational data from at least one node device within the SDWAN; and
 a command generator configured to compare the desired network configuration represented by the tree-structure with a current network configuration and generate one or more configuration commands to update one or more operational parameters of one or more node devices within the SDWAN.

12. The system of claim 11, wherein the node device comprises the command generator, the SDWAN performance analyzer is configured to send the desired network configuration to the node, and the node is configured to compare the desired network configuration to a current configuration of the node to determine if one or more changes to the current configuration of the node are required.

13. The system of claim 9, wherein the operational data comprises one or more of: bandwidth available at each of one or more node devices in the SDWAN; number of sessions flowing through each of the one or more node devices; average packet drops at each of the one or more node devices; average latency at each of the one or more node devices; traffic classes flowing through each of the one or more node devices; current traffic policies applied to traffic classes flowing through each of the one or more node devices; current routing table at each of the one or more node devices.

14. The system of claim 9, wherein the node device and the SDWAN performance analyzer is communicatively coupled through a control channel.

15. The system of claim 9, wherein the SDWAN performance analyzer is a virtual application running on the node device.

16. The system of claim 9, wherein the one or more configuration commands further comprise configuration commands to control a configuration of a node device concerning one or more of the following operational parameters: an amount of bandwidth allocated to one or more traffic classes; a routing table or access control list identifying routing rules for one or more traffic classes; a rule to route one or more traffic classes to an intermediate device to perform one or more virtual network functions.

17. The system of claim 9, wherein the SDWAN performance analyzer is located separately from the node device within the SDWAN.

18. The system of claim 9, wherein the one or more operational parameters determined for modification are one or more operational parameters of the node device, and the determination being made based on operational data associated with a different SDWAN node device.

19. A software-defined wide area network (SDWAN) performance analyzer, comprising:
   an operational data input communicatively coupled to at least one node device within a SDWAN, the operational data input configured to receive a plurality of operational data from the at least one node device;
   a network tree generator communicatively coupled to the operational data input, the network tree generator configured to apply one or more machine learning algorithms to at least the operational data received by the operational data input to generate a tree-structure representing a desired network configuration, the desired network configuration having a fewest number of changes to a configuration of one or more nodes within the SDWAN to comply with one or more client requirements and policies;
   a command generator communicatively coupled to the network tree generator, the command generator configured to compare the tree-structure from the network tree generator to a current network configuration represented by the operational data received by the operational data input, and generate one or more configuration commands to effectuate one or more changes to one or more node devices in the SDWAN based on the tree-structure; and
   a data repository communicatively coupled to the operational data input, network tree generator, and command generator, the data repository configured to store the plurality of operational data received by the operational data input, the tree-structure generated by the network tree generator, the one or more machine learning algorithms, and the current network configuration;
   wherein the one or more changes to the one or more node devices may comprise one or more of: an amount of allocated virtual memory to a virtual application executed at a node device; an amount of allocated central processing unit (CPU) cycles to a virtual application executed at a node device.

20. The SDWAN performance analyzer of claim 19, the one or more changes further comprising one or more of: an amount of bandwidth allocated to one or more traffic classes; a routing table or access control list identifying routing rules for one or more traffic classes; a rule to route one or more traffic classes to an intermediate device to perform one or more virtual network functions.

* * * * *